United States Patent [19]

Paci

[11] Patent Number: 5,104,915
[45] Date of Patent: Apr. 14, 1992

[54] METAL TINTING LACQUER COMPOSITION

[76] Inventor: Laercio Paci, 4018 Brandywine St., NW., Washington, D.C. 20016

[21] Appl. No.: 577,564

[22] Filed: Sep. 5, 1990

[51] Int. Cl.$^5$ .............................................. C08L 1/18
[52] U.S. Cl. ...................................... 524/32; 524/35
[58] Field of Search .................................. 524/32, 35

[56] References Cited

U.S. PATENT DOCUMENTS 4,421,881  12/1983  Benkendorf et al. ................ 524/32

Primary Examiner—Joseph L. Schofer
Assistant Examiner—Jeffrey T. Smith
Attorney, Agent, or Firm—Richard C. Litman

[57] ABSTRACT

A sprayable metallic-tone lacquer composition comprising a tinted polymer-solvent system containing approximately 5% to about 15% by weight of a transparent film-forming resin consisting of a mixture of an acrylic copolymer and nitrocellulose, and about 1-5% by weight of a metal-simulating dye dissolved in about 80-90% by weight of an organic solvent blend. The solvent blend preferably comprises about 25-35% by weight of acetone; 5-15% by weight each of propylene glycol methyl ether acetate, toluene, and methyl isobutyl ketone; and 5-10% by weight each of butyl benzyl phthalate, isobutyl acetate and isopropyl alcohol. The lacquer composition are particularly adapted for aerosol application and are prepared by dissolving appropriate amounts of the clear resin mixture in the solvent blend and adding the soluble dye, then pressurizing the resulting tinted resinous solution with a mutually compatible aerosol propellant in a suitable aerosol dispensing container.

5 Claims, No Drawings

METAL TINTING LACQUER COMPOSITION

BACKGROUND OF THE INVENTION

1. Field of the Invention

This invention relates to a metallic-tone lacquer composition for tinting a metal substrate. More particularly, the invention relates to a sprayable film-forming composition exhibiting a metallic appearance for forming a protective and decorative film on a metal surface.

2. Description of the Prior Art

The original luster and shine of metal surfaces are often lost upon extended exposure to environmental conditions. After prolonged periods of environmental exposure, surfaces of metal articles and constructions which are intended to present an ornamental appearance eventually deteriorate and become decidedly unsightly. In many instances refinishing or restoration of these deteriorated surfaces is necessary, since the replacement costs involved would be economically prohibitive. However, commercial refinishing processes which permit dipping the entire metal surface to be restored into an electrocoating bath or coating composition and then prompt drying of the coated surface are costly and time-consuming operations. Of course, it is not always feasible to have access to a commercial facility and merely repainting the damaged area by spraying the paint onto the metal surface does not result in a finish that approaches the original metallic appearance.

Efforts to improve the metallic appearance of surfaces have also included the use of improved lacquer compositions and presently for best results multicoat systems are used for refinishing. Multicoat coating systems comprising a metallic pigmented base coat and at least one clear resinous top coat are well known is the art as described in U.S. Pat. No. 3,639,147 to Benefiel et al. and more recently in U.S. Pat. No. 4,753,829 to Panush. However, the base and top coat compositions of the prior art are typically applied separately to a substrate by sophisticated spraying methods such as compressed air spraying, electrostatic spraying, hot spraying techniques, etc., performed using specially designed automated equipment usually only available in manufacturing facilities. Moreover, it is generally accepted that the preparation and application of these coating systems requires a high degree of skill and experience to obtain the desired metallic brilliancy and tone.

Among the host of commercially available lacquers, few may be utilized to tint a metal substrate and none appear suitable for application from readily available dispensers such as aerosol containers. This is due to the fact that most metal tinting lacquer compositions undergo severe discoloration under the influence of environmental exposure and the film coatings themselves are subject to cracking, followed by peeling and blistering. Another problem encountered in spray coating of a metal surface is an uneven, wrinkled surface that results when the film dries too quickly and entraps solvents beneath the surface of the film. Also, an uneven appearance may result when using metallic paints and drying is not carried out properly. The metallic particles, instead of being substantially uniformly distributed throughout the lacquer, tend to clump together and give a spotted appearance.

Accordingly, those skilled in the art will appreciate that it would be highly desirable to provide a conveniently sprayable metallic-tone lacquer composition for tinting a metal substrate which overcomes the problems discussed above.

SUMMARY OF THE INVENTION

It is therefore a primary object of the present invention to provide a sprayable metal tinting lacquer exhibiting a metallic appearance for forming a durable protective film and decorative coating on a metal surface which overcomes the difficulties heretofore mentioned.

Another object of this invention is to provide lacquer compositions which are sprayable from conventional aerosol dispensing containers and sprays evenly and easily to form a metallic tinted film which dries uniformly within a relatively short time without undergoing degradation under the prolonged influence of environmental conditions.

A further object of this invention is to provide an improved method of coating a metal substrate to produce a variety of metal-simulating tones exhibiting true metallic brilliancy without the inefficiency and inconvenience of electroplating.

Still another object of this invention is to formulate sprayable lacquers containing a novel solvent blend characterized by their particular evaporation rates and compatibility with a mixture of film-forming resins and other chemical constituents. The present lacquers form extremely thin coatings simulating a metallic finish when utilized in conjunction with aerosol dispensers and result in tinted films which are substantially scratch-resistant, exceptionally adherent and exhibit improved resistance to chemicals and atmospheric influences, such as moisture, heat and UV light.

These and other objects are accomplished in accordance with the present invention which provides a sprayable metallic-tone lacquer composition adapted for aerosol application comprising a tinted polymer-solvent system containing approximately 5% to about 15% by weight of a transparent film-forming resin consisting of a mixture of an acrylic copolymer and nitrocellulose, and about 1-%% by weight of a metal-simulating dye dissolved in an organic solvent blend. The lacquer composition are prepared by dissolving appropriate amounts of the clear resin mixture in the solvent blend and adding the soluble dye, then pressurizing the resulting tinted resinous solution with a mutually compatible aerosol propellant in a suitable aerosol dispensing container.

Based on extensive experimentation it has been discovered that particular solvent blends when used in conjunction with certain mutually compatible resins and propellants meet the desired physical and chemical properties required for a sprayable metal tinting lacquer composition. The lacquer compositions of the present invention, surprisingly and unexpectedly, provide uniform metallic brilliancy without the need for an interference coat or separate pigmented base.

The above description, as well as further objects, features and advantages of the present invention, will be more fully appreciated by reference to the following detailed description.

DETAILED DESCRIPTION OF THE INVENTION

While many clear, film-forming resins are available in the lacquer industry, exhaustive experimentation has shown that they are not satisfactory for utilization as metal tinting compositions because their otherwise good solubilities exhibit limitations with respect to the present solvent blends which are required to achieve the objects of the invention set forth hereinabove. It has found that only a mixture of certain methacrylate copolymers and nitrocellulose provide the desired resinous base when utilized in conjunction with the novel solvent blends of the present invention.

The resinous mixture preferably consists of a copolymer of methyl methacrylate/butyl methacrylate and nitrocellulose, wherein the relative weight percent (wt. %) ratio of methacrylate copolymer:nitrocellulose is preferably about 2:1. The copolymer constituent may be prepared by free radical polymerization of balanced amounts of methyl methacrylate and butyl methacrylate in an inert solvent such as toluene until the monomer conversion reaches about 90 to 95 percent. Free radical initiators may be any of those commonly used in the art to carry out the polymerization reaction such as, for example, t-butyl perbenzoate, di-benzoly peroxide, azobis isobutryonitrile and combinations thereof. The polymer solids are reduced to about 40% by adding additional inert organic solvent and the polymerization reaction is continued with heating at a temperature of about 200° to 220° F. until the monomer conversion is complete. At this point the viscosity of the reaction mixture is approximately 1,000 to 1,500 poise in toluene.

An appropriate amount of nitrocellulose is then added to the reaction mixture, either in the form of a solid polymer or in a suitable solvent vehicle. The resulting resinous mixture is then preferably further reduced to about 10-20 percent polymer solids by the addition of the solvent blend, optionally containing a suitable proportion of dye, with constant mixing at about 200° F. until the viscosity has dropped to about 15 to 50 poise. The resinous mixture should have a molecular weight of approximately 75,000 to 175,000.

Regarding the appropriate amount of nitrocellulose, it has been found that a low concentration of this binder constituent, results in a lacquer of low adhesion and low corrosion protection. If the nitrocellulose concentration is relatively high, the coatings produced from such lacquer formulations have a tendency to absorb water and undergo severe degradation under the influence of atmospheric conditions. Therefore, the nitrocellulose is generally held in the range of about 45-55% by weight of methacrylate copolymer solids. At this particular range, the resinous mixture possesses excellent solvent release properties without causing a clouding or distortion to occur in the dried film.

The lacquer compositions of the present invention should dry completely within a reasonably short time, approximately 5 to 30 minutes, and provide a uniform solvent evaporation curve. To achieve this result, the solvent blent must consist of solvent portions characterized by different evaporation rates. However, the consideration regarding evaporation rates alone is not sufficient for the formulation of a satisfactory solvent blend. Each of the higher boiling solvents comprising the blend must be characterized by the fact that they are not retained in any significant amount in the dried film. As each solvent component evaporates the solvency properties of the remaining blend continuously changes. Therefore, at not time during the drying process must the solvent blend change to a point where the resinous mixture or dye become insoluble or the viscosity of the resins suddenly increase.

The solvent blends for the above mentioned mixture of resins are preferably formulated from the following organic solvents: acetone, propylene glycol methyl ether acetate, butyl benzyl phthalate, toluene, isobutyl acetate, isopropyl alcohol and methyl isobutyl ketone. Other equivalent solvents which may be partially used with these solvents include ethylene glycol monobutyl ether, ethylene glycol mono-methy ether, ethyl 3-ethoxypropionate, methyl ethyl ketone and ethanol. The preferred solvent blend comprises about 25-35% by weight of acetone; 5-15% by weight each of propylene glycol methyl ether acetate, toluene, and methyl isobutyl ketone; and 5-10% by weight each of butyl benzyl phthalate, isobutyl acetate and isopropyl alcohol.

A number of organic pigments or dyestuffs may be used to tint the clear lacquer formulations of the present invention. As examples of suitable organic pigments and dyestuffs there may be mentioned those of the aniline, azo, anthraquinone, phthalocyanine, methine, xanthine, azine oxiazine and thiazine series. These pigments and dyestuffs are described in the appropriate sections of Volumes 1 and 2 of the 2nd Edition of the Colour Index which was published in 1956 under the heading "Pigments" and in subsequent authorized amendments thereto. Preferred organic dyes which may be used in the practice of this invention include Black Dye G, Black 513, Yellow C Orange 505, and Gold C, all of which are of the aniline series and are commercially available from Agate Lacquer Mfg. Co., Inc., Long Island City, N.Y. under the trademark "Agateen" as solids, dispersions of solutions. A pewter-tone lacquer coating in accordance with the present invention may be obtained by employing appropriate amounts of Black Dye G. Black 513 results in a copper-tone and a suitable mixture of Black 513 and Black Dye G affords a bronze-tone lacquer. A brass-tone composition of the invention may be produced by adding a dye mixture containing 1 part by weight of Gold, C, 2 parts Yellow C and 4 parts by weight of Orange 505. It should be understood that other available dyes which give equivalent results may be used in tinting the lacquer compositions of the present invention.

The pigments and dyes are incorporated into the solution of resinous mixture by customary processes to produce a homogeneously dispersed coating formulation. Preferably, these tinting agents provide a desired metal-luster effect to the lacquer coatings of the present invention and may constitute up to about 5% by weight of the resultant resinous dispersion.

The sprayable lacquer compositions of this invention can be packages in suitable spray valve-equipped dispensing cans using conventional propellants. It is possible to pack as little as 20% or as much as 80% of the of the present tinted lacquer formulations with from 80% to 20% propellants, depending on the desired pressures. Preferably, the aerosol containers are generally charged with up to about 30% propellant to a absolute pressure of 40-50 p.s.i., for example. Suitable propellants include gaseous fluorinated hydrocarbons and other compressed gases. However, n-butane and propane or mixtures thereof are preferably used as propellants in conjunction with the tinted polymer-solvent systems of the present invention. A mixture of n-butane and propane in a relative wt. percent ratio of 1:2, respectively, was found to be the most compatible aerosol propellant for use with the present lacquers.

The lacquer compositions according to the present invention, due to their specific drying and curing requirements, are particularly adapted for application to metal substrates. Such surfaces as glass, ceramics, asbestos, wood and even certain plastic material have been shown to be ineffectively coated with the present compositions. Exemplary metal substrates include such surfaces as steel, aluminum, copper, brass and various other alloys. Any metal object or construction which is intended to present an appealing appearance over a long period, such as household ornaments or utensils, railings, commemorative plaques, building markers, small areas of automotive bodies and the like, may be refinished utilizing the compositions of the present invention.

The metal substrate may be bare or can be treated by employing initial steps in refinishing procedures conventionally used to prepare the surface for electroplating. These steps include one or all of the following procedures: polishing to bring out luster of metal surface; dewaxing to remove oil and grease; and etching bare metal with cleaner. The polishing step insures luminosity of the final coating by causing the shine of the underlying metal surface to be reflected through the tint of the lacquers of the present invention.

The tinted lacquers of this invention are applied to the bare or treated metal substrate by spraying and air dried in about five minutes. Longer drying times are required at humidities above 70%. The lacquers are generally applied in such quantities that they form thin films when dry which have thicknesses of from 0.005 to 0.5 mm. Two or more coats usually required to built the appropriate film thickness.

The following specific example is given to further illustrate the present invention. All percents, parts and ratios are by weight unless otherwise specifically indicated.

EXAMPLE

An acrylic resin copolymer was prepared by conventional polymerization techniques using equal parts of methyl methacrylate and n-butyl methacrylate. The resulting methyl methacrylate/butyl methacrylate copolymer (10 wt. percent) and 5 wt. percent of nitrocellulose are then dissolved in the following solvent blend:

| SOLVENT | WT. PERCENT |
| --- | --- |
| Acetone | 35 |
| Propylene Glycol Methyl Ether Acetate | 10 |
| Butyl Benzyl Phthalate | 5 |
| Toluene | 10 |
| Isobutyl Acetate | 5 |
| Isopropyl Alcohol | 5 |
| Methyl Isobutyl Ketone | 10 |

The lacquer composition containing about 80% by weight of volatile solvent is then tinted by adding on the basis of weight 1% dye solution of "Gold C" containing about 5% aniline dye, 35% methyl ethyl ketone and 60% toluene to produce a gold tinted lacquer.

The gold tinted lacquer composition is packaged by charging a suitable aerosol spray dispenser can with 30% by weight of a mixture of n-butane and propane in a weight ratio of 1:2. The resulting lacquer composition contains about 90% by weight of volatile constituents.

A thoroughly clean chrome-plated panel was sprayed with a coat of the above lacquer composition at room temperature. After a 30 to 60 second flash, a second coat was applied by spraying to a film thickness of about 0.5 mm. After drying for 15-30 minutes at room temperature, the resulting gold-tone coating had an overall uniform esthetic appearance, exhibiting a very glossy surface and retains this gloss after months of exposure to atmospheric conditions such as humidity, heat and ultraviolet light. The films are also observed to have high brilliance and depth while having a metallic appearance, are relatively scratch-resistant and resistant to chemicals.

Although the invention has been shown and described with respect to detailed embodiments thereof, it will be understood that various modifications can be made without departing from the spirit and scope of the claimed invention.

I claim:

1. A sprayable metallic-tone lacquer composition adapted for aerosol application to a metal substrate comprising a tinted polymer-solvent system consisting of about 5% to about 15% by weight of a transparent film-forming resinous mixture consisting of an acrylic copolymer and nitrocellulose, said resinous mixture having a relative weight percent ratio of the acrylic copolymer to nitrocellulose of about 2:1, and about 1-5% by weight of a metal-simulating dye dissolved in about 80-90% by weight of an organic solvent blend consisting of a mixture of acetone, propylene glycol methyl ether acetate, butyl benzyl phthalate, toluene, isobutyl acetate, isopropyl alcohol and methyl isobutyl ketone.

2. The lacquer composition according to claim 1 wherein said acrylic copolymer comprises a copolymer of methyl methacrylate and butyl methacrylate.

3. The lacquer composition according to claim 1 wherein said solvent blend comprises about 25-35% by weight of acetone; 5-15% by weight each of propylene glycol methyl ether acetate, toluene, and methyl isobutyl ketone; and 5-10% by weight each of butyl benzyl phthalate, isobutyl acetate and isopropyl alcohol.

4. The lacquer composition according to claim 3 wherein said solvent blend comprises about 35% by weight of acetone; 10% by weight each of propylene glycol methyl ether acetate, toluene, and methyl isobutyl ketone; and 5% by weight each of butyl benzyl phthalate, isobutyl acetate and isopropyl alcohol.

5. The lacquer composition according to claim 1 wherein said tinted polymer-solvent system contains about 90% by weight of volatile constituents.

* * * * *